Patented Aug. 14, 1934

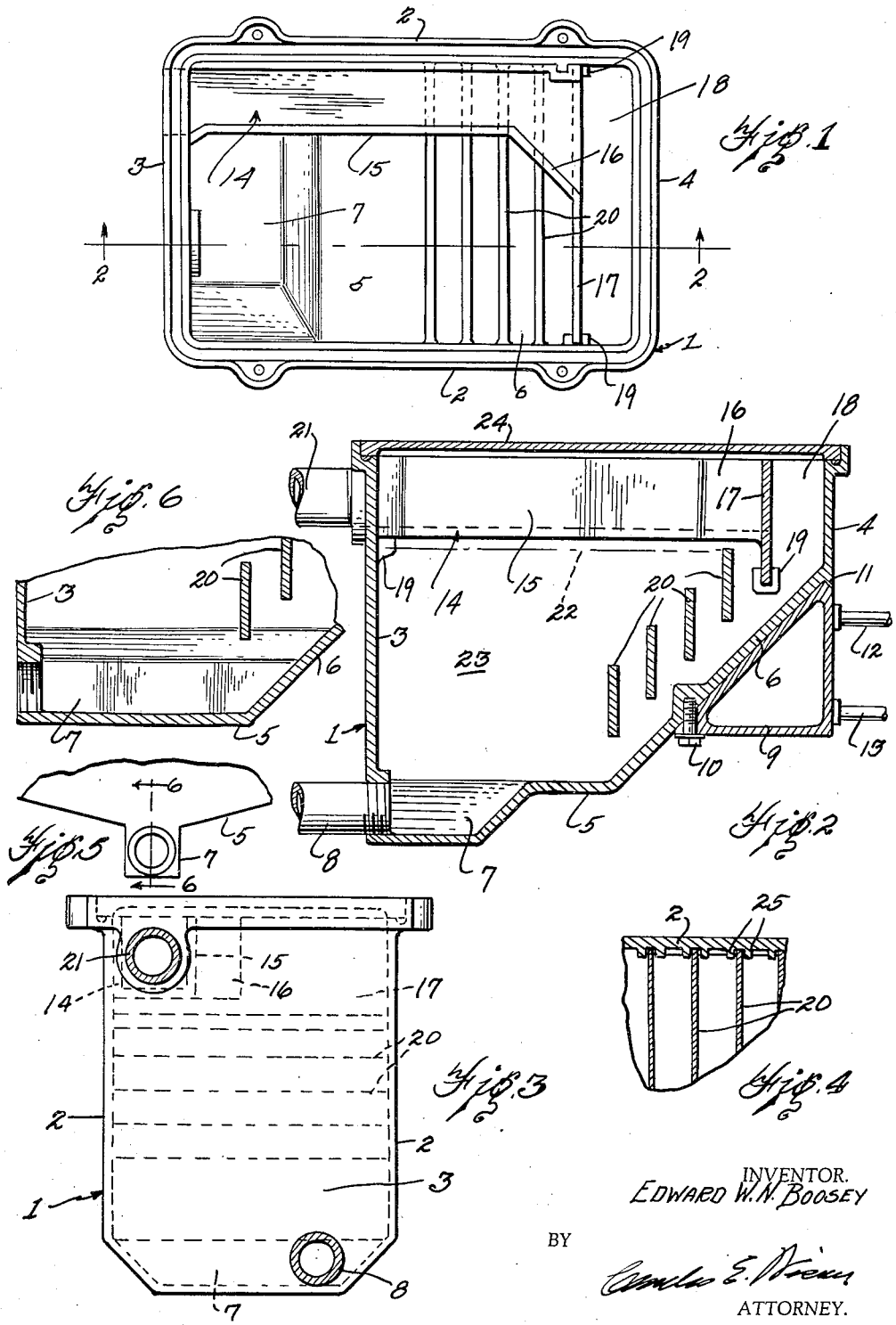

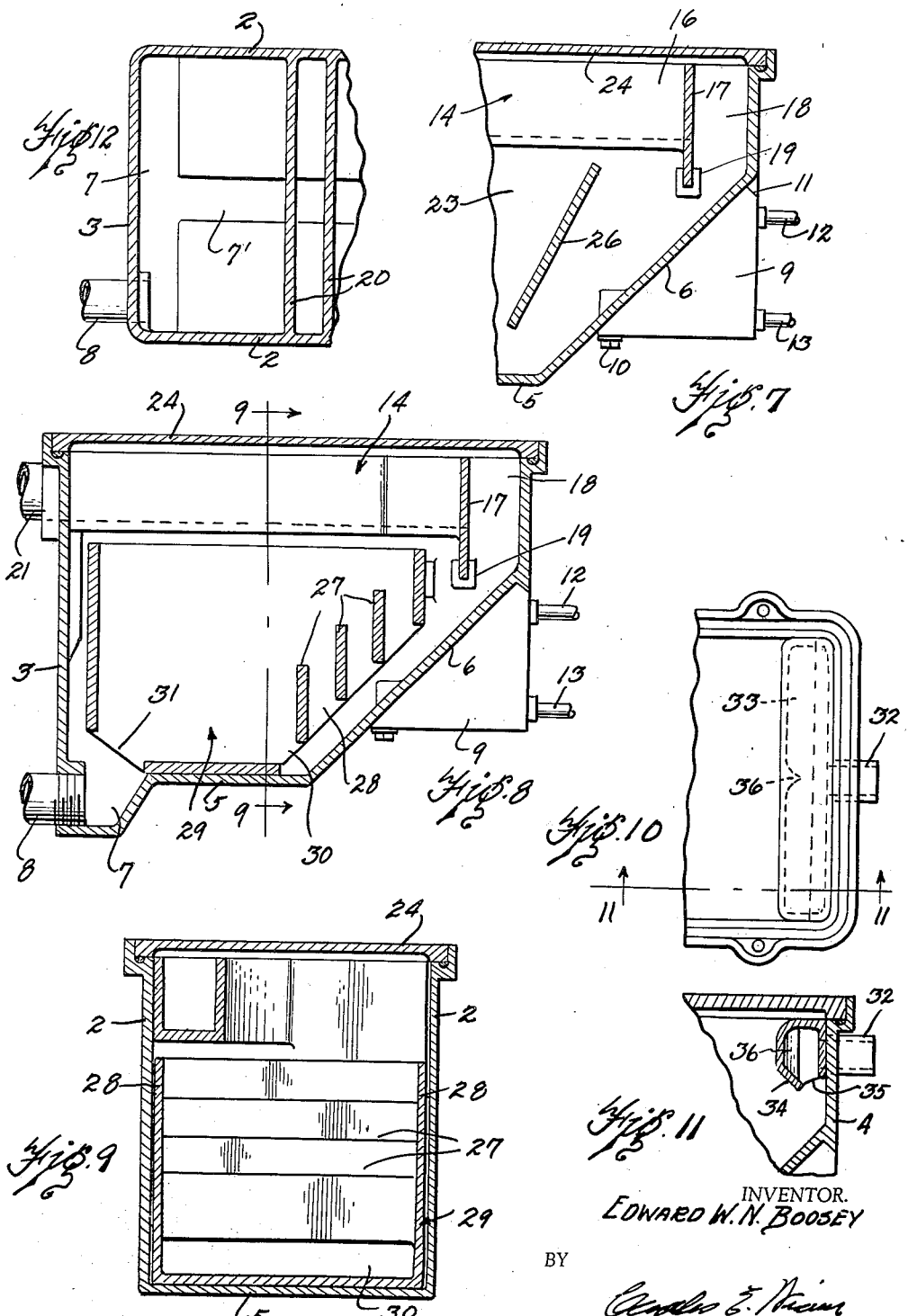

1,970,123

UNITED STATES PATENT OFFICE 1,970,123

GREASE TRAP

Edward W. N. Boosey, Detroit, Mich.

Application April 1, 1932, Serial No. 602,495

14 Claims. (Cl. 210—56)

This invention relates to grease traps and an object of the invention resides in the provision of a device of this character which may be installed in a drainage system and which is so constructed as to separate the greases, oils, etc. from the fluid entering the trap thereby preventing the greasy matter from discharging into and clogging the sewer to which the drainage system is connected.

Another object of the invention resides in the provision of a grease trap which is so constructed as to reverse the flow of the fluid discharged into the trap whereby the velocity of flow is materially decreased thereby giving time for the greasy matter to rise to the top of the fluid to permit the fluid, free from grease, to pass to the outlet of the trap.

Another object of the invention resides in the provision of a grease trap in which the fluid is discharged into the trap through a relatively small conduit, the fluid from the conduit spreading over a relatively wide area and reversed in its flow whereby the velocity of flow is materially decreased thereby providing sufficient time for the separation of the grease from the fluid as the fluid passes through the trap.

Another object of the invention resides in the provision of a grease trap in which the fluid entering the trap is discharged against one wall thereof to reverse the direction of flow, the trap provided with a plurality of baffles positioned in the path of travel of the fluid whereby the grease is skimmed from the top of the fluid and collected into the main portion of the trap and the baffles so arranged as to prevent agitation of the grease in the main portion of the trap caused by the flow of fluid therethrough.

Another object of the invention resides in the provision of a grease trap which is provided with a cooling compartment for cooling the fluid as it passes through the trap to cause the greasy matter to more quickly separate and rise to the top of the fluid, the cooling compartment connected to the cold water system of the building in which the trap is installed and positioned externally of the trap to prevent drainage matter entering the trap from passing into the water system in the event of cracking of the cooler.

Another object of the invention resides in the provision of a grease trap having a removable basket for collecting the grease, the removable basket arranged to permit the grease when solidified or congealed to be removed in a body from the trap.

A still further object of the invention resides in the provision of a trap which is so constructed as to permit a maximum flow of fluid therethrough and which is extremely efficient in operation permitting only an extremely small amount of greasy matter to pass from the trap.

A still further object of the invention resides in the provision of a trap which will practically fill with grease before the intake thereto becomes clogged up but which so constructed as to prevent passage of fluid through the trap prior to the clogging of the discharge conduit therefrom.

These objects and the several novel features of the invention are hereinafter more fully described and claimed and the preferred form of construction by which these objects are attained is shown in the accompanying drawings in which—

Fig. 1 is a top plan view of one form of trap the cover therefor being removed.

Fig. 2 is a section taken on line 2—2 of Fig. 1.

Fig. 3 is an end view thereof.

Fig. 4 is a detail sectional view showing a modified form of baffle construction.

Fig. 5 is a view similar to Fig. 3 showing a modified form of construction.

Fig. 6 is a section taken on line 6—6 of Fig. 5.

Fig. 7 is a sectional view similar to Fig. 2 showing another modified form of construction.

Fig. 8 is a view similar to Fig. 2 showing a removable basket in the main portion of the trap.

Fig. 9 is a section taken on line 9—9 of Fig. 8.

Fig. 10 is a partial top plan view of another form of construction.

Fig. 11 is a section taken on line 11—11 of Fig. 10.

Fig. 12 is a sectional plan view of a modified form of construction.

Referring to the drawings, the body 1 of the trap is approximately rectangular in plan and comprises the side walls 2, the end walls 3 and 4 and the base 5. As is more clearly shown in Fig. 2, the base is formed with the portion 6 sloping downwardly from the wall 4 toward the wall 3 and is further formed with the well 7 positioned adjacent the wall 3 and to which the outlet 8 opens. The cooling chamber 9 is secured to the sloping portion 6 of the base and is connected thereto by means of the screw 10 and the ledge 11. The water pipes 12 and 13 are connected to the chamber 9 and supply a fresh volume of cold water thereto whenever a faucet (not shown), in the building in which the trap is installed, is opened. It will be seen that since the chamber 9 is positioned externally of the trap that in the event of cracking of the wall of the cooling chamber adjacent the trap that waste water from the trap cannot enter the water system.

A conduit 14 of trough shaped form extends from the end wall 3 of the trap to a point in spaced relation to the wall 4, and the side wall 15 of the trough is flared outwardly at 16 and the portion 17 is formed co-extensive therewith extending approximately parallel to the end wall 4 thereby forming a compartment 18 between the end of the trough 14 and the end wall 4. The member 14 is removable from the body 1 and is suitably supported by the lugs 19. The vertically extending spaced baffles 20 extend from side to side of the body 1 for a purpose to be hereinafter described. The inlet 21 extends through the end wall 3 and opens into the conduit 14. It will thus be seen that as the fluid is discharged into the conduit 14 from the inlet 21 that the fluid will be spread over a relatively wide area as it empties from the conduit into the compartment 18 and will strike against the end wall 4 to reverse the direction of flow whereby the velocity of flow is practically nil. Ordinarily the liquid level is at the height shown by dotted lines 22 in Fig. 2, the fluid entering the compartment 18 will drain down over the sloping wall 6 and the lower edge of the baffles 20 will scrape the grease therefrom permitting the grease to rise between the baffles 20 into the grease retaining compartment 23. The balance of the fluid will drain down into the well 7 and will pass out of the outlet 8, the same discharging to the sewer.

It will be noted therefore that the compartment 23 gradually fills with grease but due to the fact that the velocity of flow of the fluid is practically dissipated and also to the fact that the baffles 20 are positioned in the path of flow of the fluid that practically no agitation will be occasioned to the grease and fluid in the compartment 23. The grease will gradually fill in the compartment 23 and when the same is practically filled the compartment 18 will gradually fill up with grease and when cooled and allowed to congeal by standing for a time, undisturbed, will prevent flow of fluid through the trap. When this occurs it is necessary to remove the cover 24 and the trough shaped conduit 14 and clean the trap and then by replacing the conduit 14 and the cover 24 the device is again ready for use. Referring to Fig. 4, I have shown the baffles 20 as being of sheet metal and slidably positioned in the guides 25 formed in the side walls 2. Referring to Figs. 5 and 6 the base 5 slopes inwardly toward the center of the trap and the well 7 is in the form of a trough which extends from the wall 3 to the sloping portion 6 of the base 5. Referring to Fig. 7, I have shown a single sloping baffle 26. It will be seen that this baffle will also prevent agitation of the grease and liquid in the compartment 23 as the fluid passes through the trap.

Referring to Figs. 8 and 9, the trap is similar to the structures shown in Figs. 1, 2 and 3 but the baffles 27 extend between the side walls 28 of the basket 29. These baffles being spaced from the sloping wall 6 of the base will permit fluid to pass down the said wall and through the opening 30 into the basket and thence pass from the basket through the opening 31 to the well 7. In the event the grease is cooled sufficiently as to cause the same to congeal it will be seen that the basket 29 may be lifted from the body 1, after the cover 24 and the conduit 14 has been removed, to lift the solidified grease in a body from the compartment 23.

Referring to Figs. 10 and 11, I have shown the inlet 32 entering through the wall 4 and discharging into the member 33 extending from side to side of the body 1. The member 33 is formed with the sloping portion 34 to direct the flow of fluid through the opening 35, which also extends between the side wall and against the wall 4 whereby the direction of flow will be reversed and the velocity of flow materially retarded. A deflector 36 is aligned with the inlet 32 and will direct the flow of fluid outwardly toward the sides 2 of the body 1. Where an extremely short trap is used it is extremely difficult to sufficiently retard the velocity of flow through the trap to permit the greasy matter to rise to the top of the fluid.

Referring therefore to Fig. 12 it will be seen that the outlet conduit 8 is positioned adjacent one of the side walls 2 and does not align with the longitudinally extending trough shaped portion 7' opening into the well 7 so that fluid flowing through the trough shaped portion 7' will strike against the end wall 3 to thereby further check the velocity of flow to permit the grease to rise to the top of the fluid.

It will be noted that in all of the forms shown that the direction of flow of the fluid through the trap will be reversed and will be spread over a relatively wide area so that the velocity of flow is practically dissipated so as to cause practically no agitation to the grease in the main compartment and to give sufficient time to permit separation of the grease from the fluid so that the fluid passing from the outlet of the trap is practically free from greasy matter.

It will be further noted that all of the baffles extend below the level of the fluid in the main compartment and that the inlet conduit extends over the main compartment so that the discharge therefrom will not agitate the fluid in the main compartment.

From the foregoing description it becomes evident that I have provided a grease trap which is extremely efficient in operation, and which will maintain a maximum volume of flow of fluid therethrough while still separating the grease from the fluid and retaining the grease in the trap.

Having thus fully described my invention, its utility and mode of operation, what I claim and desire to secure by Letters Patent of the United States is—

1. In a grease trap, a hollow body having inlet and outlet conduits, a grease retaining compartment in the hollow body the inlet conduit extending over the grease retaining compartment, a stationary wall positioned adjacent and in spaced relation to the discharge end of the conduit whereby the fluid is reversed in its direction of flow through the trap, a baffle positioned in the path of travel of the fluid after its reversal in direction of flow, the baffle further positioned below the fluid level line in the grease retaining compartment, the lower edge of the baffle positioned adjacent and in spaced relation to the base of the hollow body whereby grease is separated from the fluid and accumulates in the grease retaining compartment permitting the fluid comparatively free from grease to pass to the outlet of the trap.

2. In a grease trap, a hollow body, having inlet and outlet conduits, a grease retaining compartment in the hollow body, the inlet conduit extending over the grease retaining compartment discharging against the wall of the hollow body, whereby the fluid is reversed in its direction of flow through the trap, a plurality of baffles positioned in the path of travel of the fluid after its reversal in direction of flow, the baffles further positioned with the upper edges below the fluid level line in the grease retaining compartment, the lower edge of the baffles positioned adjacent the base of the hollow body and in spaced relation thereto whereby grease is skimmed from the top of the fluid and passed into the grease retaining compartment permitting the fluid comparatively free from grease to pass to the outlet of the trap.

3. In a grease trap, a hollow body, having inlet and outlet conduits, a grease retaining compartment in the hollow body, the inlet conduit extending over the grease retaining compartment discharging against the wall of the hollow body, whereby the fluid is reversed in its direction of flow through the trap, a baffle positioned in the path of travel of the fluid after its reversal in direction of flow, the baffle further positioned below the fluid level line in the grease retaining compartment, the lower edge of the baffle positioned adjacent the base of the hollow body and in spaced relation thereto whereby grease is skimmed from the top of the fluid and passed into the grease retaining compartment permitting the fluid comparatively free from grease to pass to the outlet of the trap.

4. In a grease trap, a hollow body, a conduit entering therein, the discharge end of the conduit positioned adjacent and in spaced relation to one wall of the hollow body whereby the fluid discharged from the conduit is reversed in its direction of flow through the trap, an outlet conduit opening into the hollow body, a series of baffle plates positioned in the path of travel of the fluid after its reversal in direction of flow, the lower edges of the baffle positioned adjacent and in spaced relation to the bases of the hollow body and the upper edges terminating successively at different heights from a horizontal line whereby grease is skimmed from the top of the fluid by the baffles permitting the fluid comparatively free from grease to pass to the outlet of the trap.

5. In a grease trap, a hollow body, a conduit therein positioned adjacent the upper edge thereof, an inlet connected to one end of the conduit for discharging fluid thereinto, the conduit having a discharge opening positioned adjacent one wall of the hollow body whereby the fluid is caused to strike thereagainst to reverse the direction of flow of the fluid through the trap, an outlet conduit opening into the hollow body at a point below the inlet opening, a plurality of baffles positioned in the path of travel of the fluid after it has reversed its direction of flow, said baffles being arranged with both the upper and lower edges of the respective baffles at different distances from the horizontal and also being spaced from the base to permit fluid to pass therebelow whereby grease is separated from the fluid in passing to the outlet.

6. A grease trap comprising a hollow body, a conduit therein positioned adjacent the upper edge thereof, an inlet connected to one end of the conduit for discharging fluid thereinto, the discharge end of the hollow conduit positioned adjacent and in spaced relation to one wall of the hollow body, whereby the fluid is caused to strike the said wall and reverse its direction of flow through the trap, an outlet conduit opening into the hollow body at a point adjacent the base thereof, the base of the hollow body having a portion sloping downwardly from the wall against which the fluid strikes toward the outlet conduit, a plurality of substantially vertically extending baffles positioned in the path of travel of the fluid after it has reversed its direction of flow, the lower edge of the baffles positioned adjacent and in spaced relation to the sloping portion of the base whereby the grease is skimmed from the top of the fluid by the baffles permitting the fluid free from grease to pass to the outlet conduit of the trap.

7. A grease trap comprising a hollow body, a conduit therein positioned adjacent the upper edge thereof, an inlet connected to the conduit for discharging fluid thereinto, the conduit having an enlarged discharge opening, positioned adjacent and in spaced relation to one wall of the hollow body whereby the fluid is caused to strike thereagainst to reverse the direction of flow thereof through the trap, an outlet conduit opening into the hollow body at a point adjacent the base thereof, a plurality of baffles positioned in the path of travel of the fluid after its reversal in direction of flow, the lower edges of the baffles positioned adjacent and in spaced relation to the base of the body and the upper edges being successively at different distances below the fluid level whereby the grease is skimmed from the top of the fluid by the baffles permitting the fluid free from grease to pass to the outlet conduit of the trap.

8. In a grease trap, a hollow body having inlet and outlet openings at the same end, a conduit at the top of the body opening to the inlet and arranged to discharge inflowing liquid against the opposite side of the body thereby reversing the direction of flow of the fluid from the inlet to the outlet, a removable bucket through which the fluid flows in its path of travel including a plurality of baffles positioned in the path of travel of the fluid after its reversal in direction of flow for further retarding the velocity of flow of the fluid and for skimming the grease from the top of the fluid permitting the fluid free from grease to pass to the outlet of the hollow body.

9. In a grease trap, a hollow body, having inlet and outlet openings, a conduit at the top of the body opening to the inlet and arranged to discharge inflowing liquid against the opposite side of the body thereby reversing the direction of flow of the fluid from the inlet to the outlet to retard the velocity of flow thereof, the hollow body having a removable grease retaining compartment, means in the hollow body positioned in the path of travel of the fluid after its reversal in direction of flow for preventing agitation of the fluid in the grease retaining compartment and for skimming the grease from the top of the fluid permitting the grease to rise into the grease retaining compartment and permitting the fluid free from grease to pass to the outlet of the hollow body.

10. A grease trap comprising a hollow body, a conduit therein positioned adjacent the upper edge thereof, an inlet connected to one end of the conduit for discharging fluid thereinto, the discharge end of the conduit positioned adjacent and in spaced relation to one wall of the hollow body whereby the fluid is caused to strike the said wall, to thereby reverse the direction of flow of the fluid through the trap, an outlet conduit opening into the hollow body at a point adjacent the base thereof, the base of the hollow body having a portion sloping downwardly from the wall against which the fluid strikes toward the outlet conduit, a baffle positioned in the path of travel of the fluid after it has reversed its direction of flow, the lower edge of the baffle positioned adjacent and in spaced relation to the sloping portion of the base whereby the grease is skimmed from the top of the fluid by the baffle permitting the fluid free from grease to pass through the outlet conduit of the trap.

11. In a grease trap, a hollow body having inlet and outlet openings at the same end, a conduit at the top of the body opening to the inlet and arranged to discharge inflowing liquid against the opposite side of the body thereby reversing the direction of flow of the fluid from the inlet to the outlet to retard the velocity of flow thereof, and removable means in the trap positioned in the path of travel of the fluid after its reversal in direction of flow for further retarding the velocity of flow of the fluid and for skimming the grease from the top of the fluid permitting the fluid free from grease to pass to the outlet of the hollow body.

12. A grease trap comprising a hollow body, a conduit therein positioned adjacent the upper edge thereof, an inlet connected to one end of the conduit for discharging fluid thereinto, the conduit having an enlarged discharge opening for discharging fluid into an enlarged compartment whereby the velocity of flow of the fluid is materially retarded, the enlarged discharge opening of the conduit positioned adjacent and in spaced relation to one wall of the hollow body whereby the fluid is caused to strike the said wall and reverse its direction of flow through the trap, an outlet conduit opening into the hollow body at a point adjacent the base thereof, a baffle positioned in the path of travel of the fluid after its reversal in direction of flow to further retard the velocity of travel of the fluid, the lower edge of the baffle positioned adjacent and in spaced relation to the base of the hollow body whereby the grease is skimmed from the top of the fluid by the baffle permitting the fluid free from grease to pass to the outlet of the trap, and a removable grease retainer between the said outlet and said baffle in which the skimmed grease may accumulate.

13. In a grease trap, a hollow body, a removable hollow member positioned in the hollow body, and having an outlet adjacent the base thereof, a conduit positioned in the hollow body and above the hollow member, an inlet connected to the conduit for discharging the fluid thereinto, the conduit having a discharge opening positioned adjacent and in spaced relation to one wall of the hollow body, to reverse the direction of flow of the fluid through the trap, an outlet conduit opening into the hollow body at a point below the inlet opening thereof, a plurality of spaced baffles positioned in the hollow member, the space between the baffles forming inlet openings into the hollow member, the baffles positioned in the path of travel of the fluid after it has reversed its direction of flow whereby the grease is skimmed from the top of the fluid by the baffles and passed into the hollow member through the space between the baffles permitting the fluid free from grease to pass through the hollow member and through the outlet opening therein to the outlet in the hollow body, the hollow member permitting the grease when solidified to be removed in a body from the trap.

14. In a grease trap, a hollow body, a removable hollow member positioned in the hollow body, a conduit positioned in the hollow body and above the hollow member, an inlet connected to the conduit for discharging fluid thereinto the conduit having a discharge opening positioned adjacent and in spaced relation to one wall of the hollow body to reverse the direction of flow of the fluid through the trap, an outlet conduit opening into the hollow body at a point below the inlet opening, a plurality of spaced baffles positioned in the hollow member, the space between the baffles forming inlet openings into the hollow member, the baffles positioned in the path of travel of the fluid after it has reversed its direction of flow whereby the grease is skimmed from the top of the fluid by the baffles and passed into the hollow member through the inlet openings therein, permitting the fluid free from grease to pass to the outlet of the trap, the hollow member permitting the grease when solidified to be removed in a body from the trap.

EDWARD W. N. BOOSEY.